April 2, 1929.  W. L. WRIGHT  1,707,836
REFRIGERATING SHIPPING PACKAGE
Filed Jan. 13, 1926  4 Sheets-Sheet 1

Inventor
Wilbur L. Wright
By Hubert E. Peck
Attorney

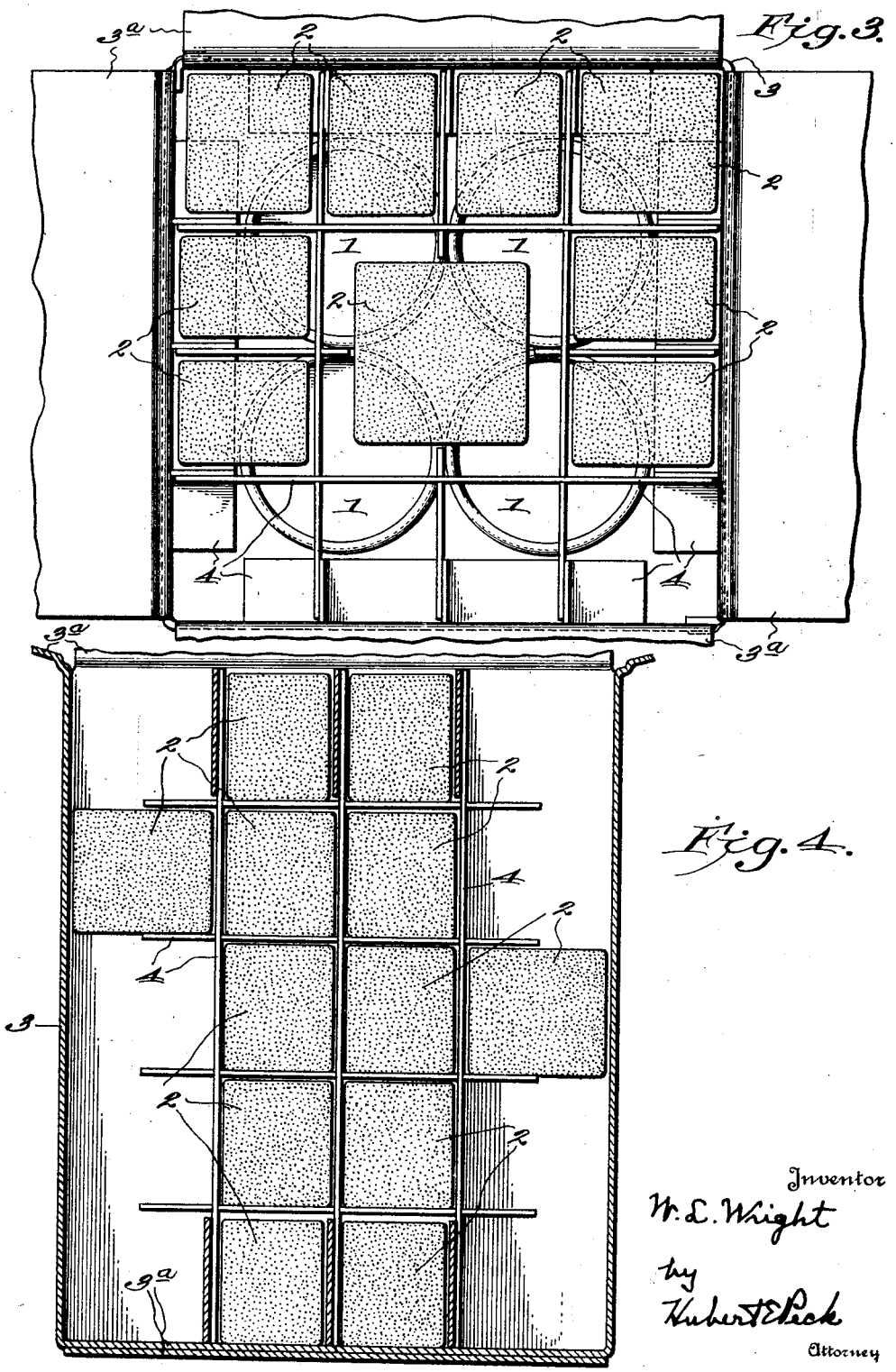

April 2, 1929. W. L. WRIGHT 1,707,836
REFRIGERATING SHIPPING PACKAGE
Filed Jan. 13, 1926  4 Sheets-Sheet 3

Inventor
W. L. Wright
by Hubert E. Peck Attorney

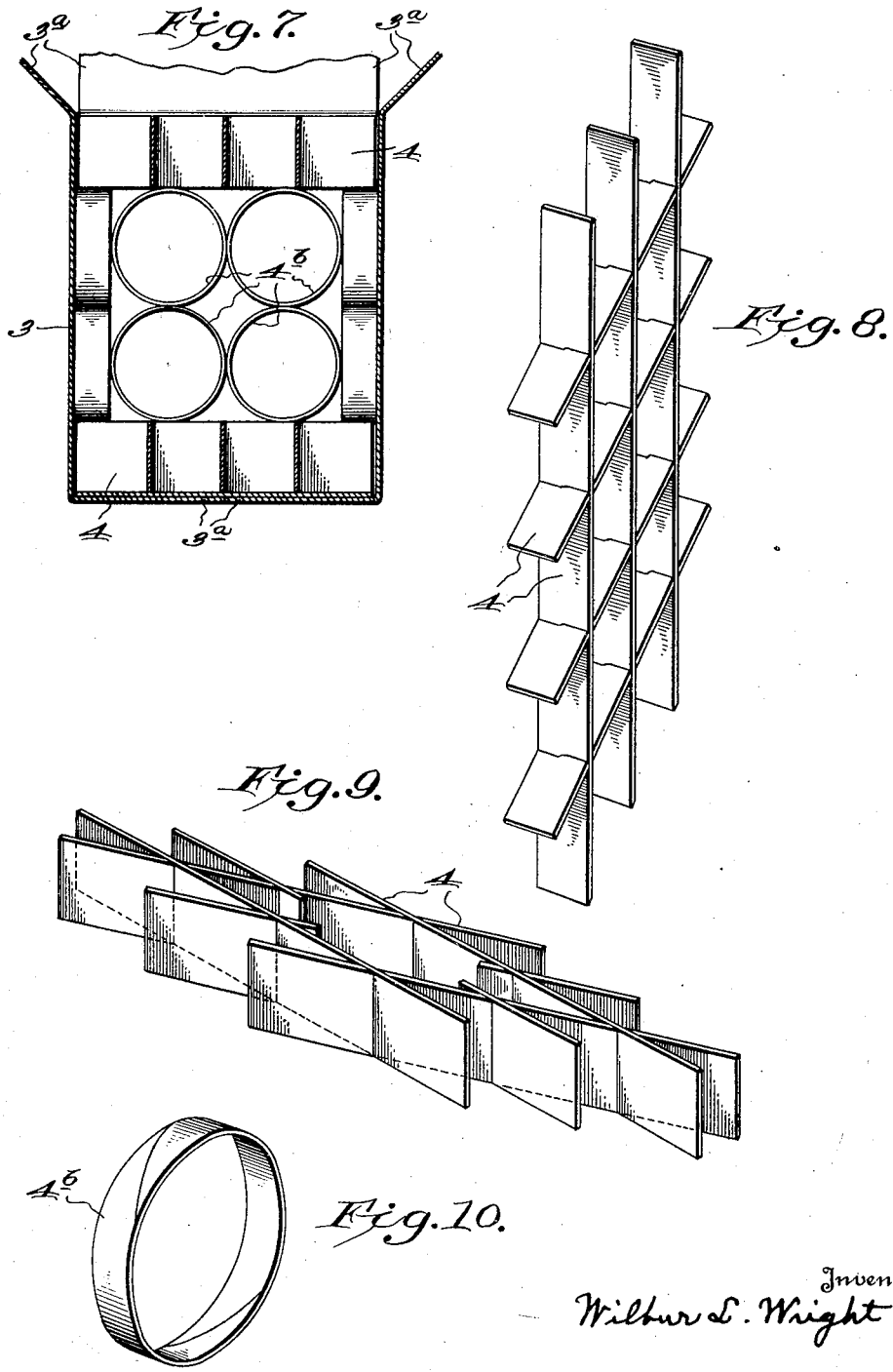

Patented Apr. 2, 1929.

1,707,836

UNITED STATES PATENT OFFICE.

WILBUR L. WRIGHT, OF FULTON, NEW YORK, ASSIGNOR TO OSWEGO FALLS CORPORATION, OF FULTON, NEW YORK, A CORPORATION OF NEW YORK.

REFRIGERATING SHIPPING PACKAGE.

Application filed January 13, 1926. Serial No. 81,005.

This invention relates to refrigerating packages of frozen products, such as ice cream and the like, and the objects and nature of the invention will be readily understood by those skilled in the art in the light of the following explanations of the accompanying drawings that illustrate what I now believe to be the preferred mechanical expression or embodiment of the invention from among other forms and arrangements within the spirit and scope thereof.

It is an object of the invention to provide an improved shipping, protecting, temperature retaining and carrying package of any desired frozen product or products such as ice cream.

A further object of the invention is to provide comparatively inexpensive means, the major element of which can be shipped or packed in compact knocked down or collapsed flat form, capable of being readily expanded to operative form, to provide a strong durable shipping or carrying case to receive, enclose and protect one or more preferably domestic size containers of frozen product that will provide insulating air spaces surrounding the container or containers with provision for the reception and retention of a suitable refrigerant, with the end in view of maintaining the low temperature of the frozen product for a comparatively extended period of time and to thereby increase the distances to which ice cream and frozen products can be shipped or delivered while keeping the costs sufficiently low to permit non-return or one time use of the shipping or carrying case.

With these and other objects in view, my invention consists in certain novel features of construction and in combinations and arrangements as more fully and particularly set forth and specified hereinafter.

Referring to the accompanying drawings forming a part hereof.

Fig. 3 is a top plan of the package, with the top flaps in opened position, showing refrigerant units arranged in the package above the containers of frozen product within the package.

Fig. 4 is a vertical section taken in the plane of the line 4—4, Fig. 2 showing refrigerant units packed in the package beside the containers of frozen product.

Fig. 7 is a vertical section of a package with the top flaps in opened position, showing annular or ring-like paper material spacers and refrigerant holders between the exterior side walls of the package and the vertical side walls of the central group of ice cream boxes or containers, with the collapsible paper strip spacers and refrigerant retainers arranged above and below the boxes or containers.

Fig. 8 is a detail perspective of a set of paper strip spacers and refrigerant retainers in operative expanded form.

Fig. 9 is a detail perspective showing a set of strip spacers in partially collapsed or flat form.

Fig. 10 is a detail perspective of one of the ring spacers and refrigerant retainers.

Figure 1:
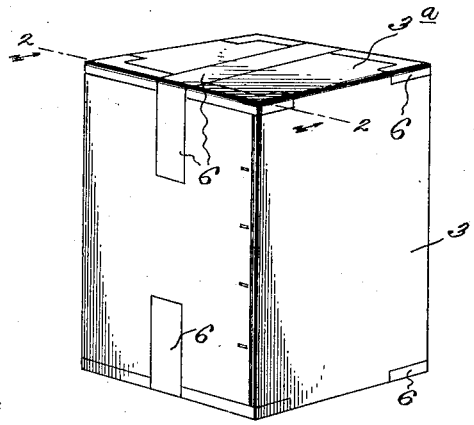
Fig. 1 is a perspective view of a closed package of frozen product, such as ice cream, of my invention.
Figure 2:
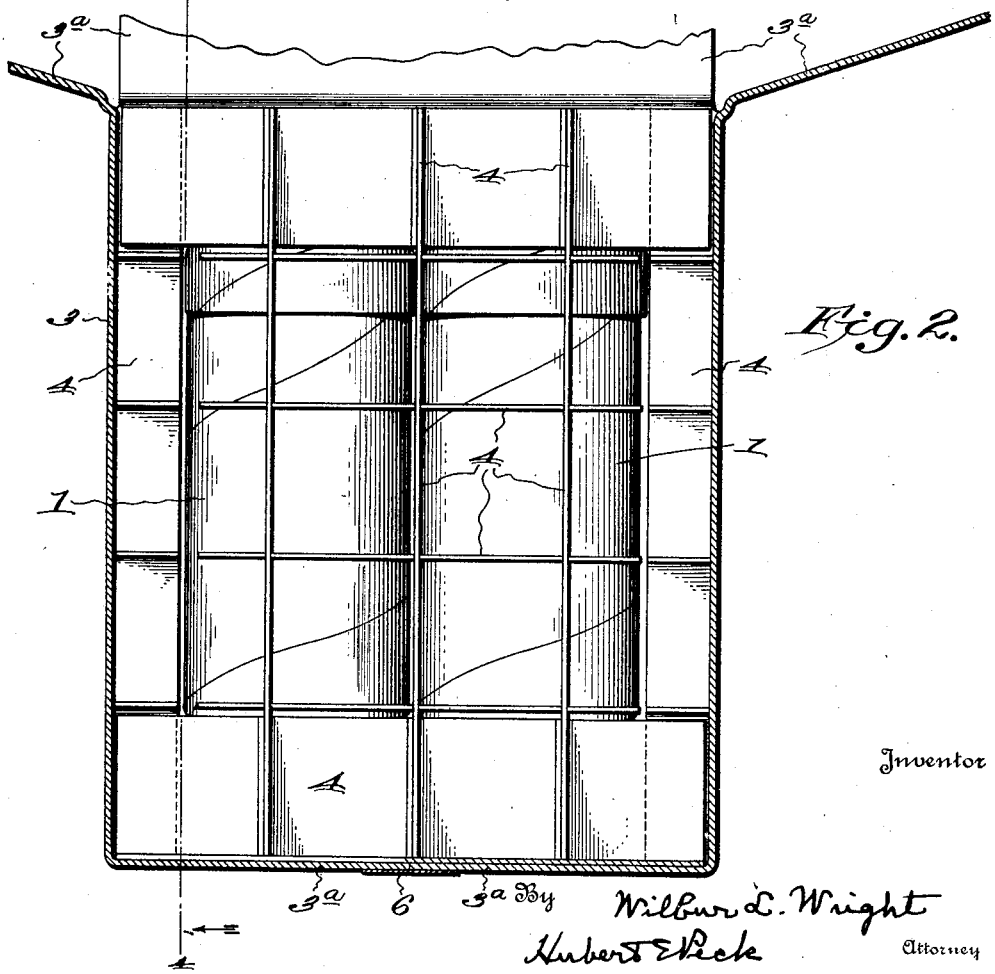
Fig. 2 is a vertical section taken in the plane of the line 2—2, Fig. 1, on a larger scale, and showing the package before closing or sealing.
Figure 5:
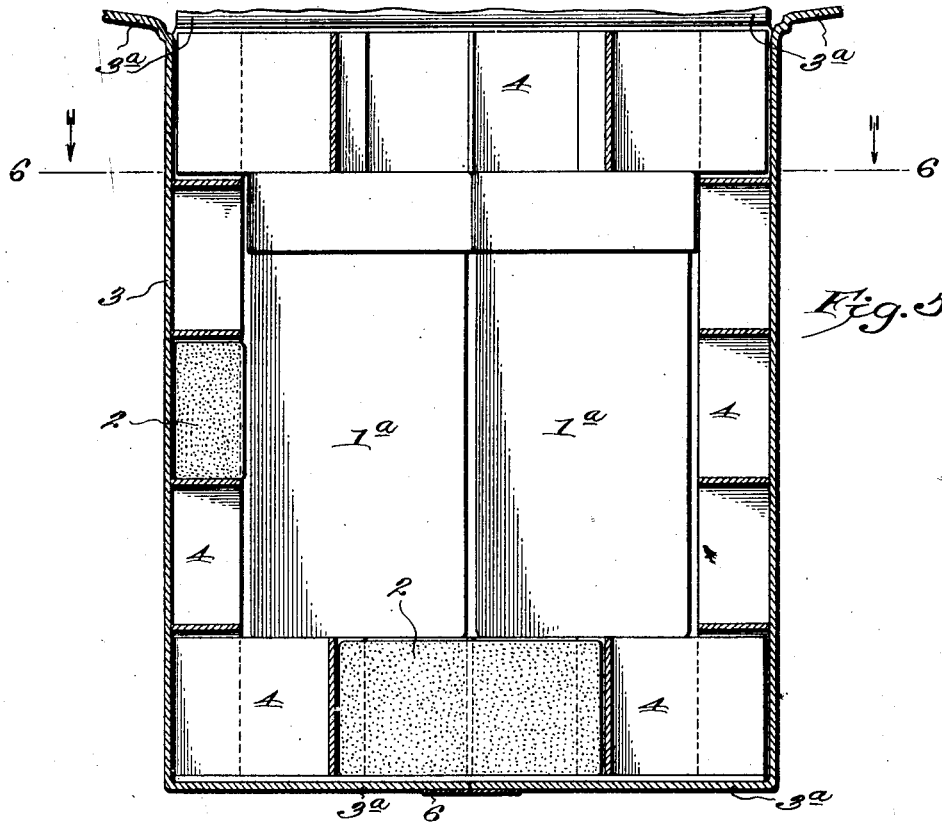
Fig. 5 shows a package in vertical section containing rectangular boxes or containers of frozen product in brick form with refrigerant units within the package at the exterior of the boxes or containers.
Figure 6:
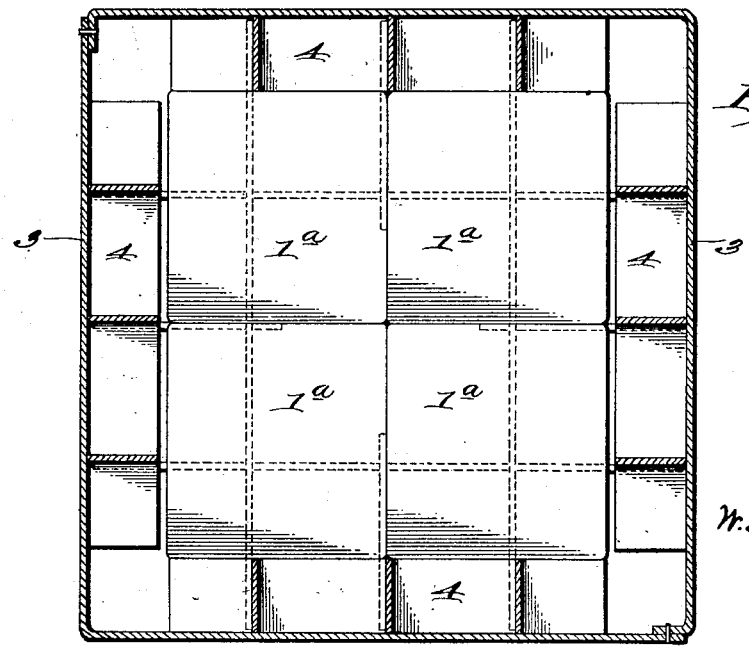
Fig. 6 is a horizontal section on the line 6—6, Fig. 5.

In the form particularly illustrated by Figs. 2 and 3 I show, say approximately four quarts of ice cream frozen in four separate closed cylindrical paper containers or cans 1, each of approximately one quart capacity. In the form of Figs. 5 and 6, I show, say approximately four quarts of hard frozen so-called brick ice cream in four separate closed rectangular paper boxes or containers 1ª, each of approximately one quart capacity. In both forms, whatever the shape of the container, the separate containers of hard frozen edible product, 1, or 1ª, are grouped in vertical position side by side, in the longitudinal central portion of the package, and the group of ice cream containers, is spaced from the exterior top, bottom and side walls of the package.

Each container of frozen product 1, or 1ª, constitutes a separate marketable commodity or article of manufacture, usually of domestic size, and the problem is to extend to the maximum the edible life or hard frozen condition of the product, or in other words, the length of time that can intervene between the departure of the container of frozen product from the producer or dispenser thereof and the opening thereof for consumption of the ice cream in the desired edible condition by the recipient or ultimate consumer, and this within the cost limits established by trade requirements and the selling prices of ice cream and frozen products. I have accomplished the end sought by supporting the several paper containers of hard frozen product, within a strong durable paper or fibrous material rectangular carton expanded from flat or collapsed form, by loose spacing means that provide insulating air spaces within the carton and surrounding the group of containers of frozen product and that receive and retain refrigerant located in such air spaces.

As the refrigerant, I prefer to employ cakes, blocks or disks of solidified $CO_2$, or so-called "dry ice", which is snow like in form or condition, and of a very low temperature. This product gradually returns to the gaseous form as it takes up heat from surrounding air and objects, and finally disappears without leaving a liquid deposit. However, I can also use as the refrigerant element or unit other products that possess the quality of gradually taking up heat and maintaining a low temperature within the package over a more or less extended period of time, and that are otherwise adapted for my purposes for use in the peculiar situation herein set forth. For instance, the refrigerant can consist of one or more units or packages of frozen brine of a size or sizes to be retained at the exterior of the ice cream containers, by the spacers or otherwise.

In the drawings, I more or less diagrammatically illustrate refrigerant units 2, and each unit preferably consists of a cake of "dry ice", i. e. snow like solidified $CO_2$.

The exterior protective and enclosing walls of the package, are formed by a rectangular carton 3, composed of more or less heavy, strong paper, such as pulp, material sheets creased and secured together to fold and collapse to flat form for packing in small compass, and capable of expanding to operative rectangular form with top and bottom flaps 3ª, capable of folding inwardly to close the top and bottom of the carton and form the top and bottom walls thereof. The rectangular collapsible carton 3, employed is of far greater capacity than required for the reception of the group of containers of frozen ice cream, and the internal depth of the carton substantially exceeds the length of any one of the containers of frozen ice cream.

The group of containers of frozen ice cream is centered and supported within the carton by any suitable loose inexpensive spacers.

For instance, I show several groups of paper strip egg case fillers 4, for this purpose. Each such spacer 4, consists of a series of spaced parallel strips of somewhat stiff paper and another series of spaced parallel paper strips traversing the first named series approximately at right angles, with the sets of strips more or less loosely interlocking by reason of transverse cuts at the intersecting points. The egg case filler or cell section thus formed can be collapsed to flat form for packing in small compass, and can be readily expanded to operative form with the edgewise arranged strips forming approximately square openings or cells.

Sections or units of these spacers are removably or loosely arranged at all sides of and above and below the group of containers of ice cream and thus support and space the group away from the interior surfaces of all six walls of the exterior carton, and provide an insulating air space surrounding the group of cartons, with opportunity, if need be, for air circulation within said space, as the paper strips forming the spacers do not constitute air tight partitions traversing said space.

Furthermore, the spacers have loose edge contact only with the interior surfaces of the carton and the exterior surface of the group of containers of ice cream, and hence transfer of heat by conduction is reduced to the minimum.

In forming the package, a folded flat carton is expanded to operative form and the bottom flaps thereof are folded together to form the closed bottom or floor of the carton.

An expanded spacer is then inserted in the carton to rest loosely on the carton floor, preferably, fitting and centered within the vertical walls of the carton. One or more units of refrigerant is, or are, inserted in cells or openings of said spacer so as to be retained thereby.

The paper boxes or cans of hard frozen ice cream are then placed in the carton on end on the top edge of the bottom spacer so as to be upheld and loosely supported by such spacer. Spacers in upright positions are then dropped into the carton along all four vertical side walls of the carton and surrounding and presenting the edges of their paper strips to the group of containers of frozen ice cream and to the inner surfaces of the carton vertical walls. One or more or all of the side spacers can carry and retain units of refrigerant, located in one or more of the cells thereof.

These side spacers surround the group of vertical parallel containers of hard frozen product, and more or less loosely hold the several containers together with their vertical walls abutting, to form the group.

After the side spacers have been inserted, the top spacer is inserted in the top of the carton and with its lower strip edges resting on the upper ends of the group of ice cream filled containers. One or more units of refrigerant can be inserted in cells of such top spacer. After the top spacer has thus been placed in position, the top flaps of the carton are folded up and down to closed position. The top and bottom carton flaps are secured and usually sealed in any suitable manner or by any desirable means, although I find the paper sealing tape 6, of commerce desirable for the purpose of securing and sealing the flaps in closed position.

The package thus produced and containing a suitable refrigerant, will retain ice cream in a frozen condition desirable for human consumption, for a considerable length of time, at a minimum expense for packing and refrigerant, in fact at such low cost as to provide a non-returnable or one way package, that can be cast aside when the boxes of ice cream are removed. The paper boxes or cans of hard frozen ice cream are completely enclosed and thoroughly protected to stand shipment by mail, express, truck or airplane. The package can be easily opened by severing the paper securing tape and then swinging up the top flaps of the carton. The top spacer can then be removed. The paper cans or boxes of frozen ice cream can then be lifted from the package as required for consumption. The containers of ice cream can be lifted from the package one at a time as required, if so desired, and the package can be again closed after each container removal, to protect the frozen product remaining in the package, so far as possible against temperature exchange.

The cartons and spacers can be packed in small compass in flat collapsed form and thus kept in stock by the dispenser or manufacturer of ice cream or other frozen products in paper boxes or cans, and the package can be quickly formed as hereinbefore described for more or less long distance shipment or delivery, and the expense involved is sufficiently reasonable to permit the ultimate consumer to discard the remainder of the package after removal of the containers of ice cream.

Various economical and effective forms of spacers and refrigerant retainers can be employed.

For instance, loose paper rings $4^b$, can be employed for spacers and refrigerant retainers, particularly as side spacers between the vertical side walls of the carton and the group of containers of ice cream. These paper rings have only loose edge contact with the container and side carton walls, and can loosely rest on each other where a multiplicity of such rings are dropped into the side spaces within the carton around the group of containers. These rings are inexpensive and can be cut from long paper tubes formed by tube winders.

The rings can be creased at diametrically opposite points to collapse or fold to flat form for packing in small compass.

If so desired the carton can be rendered approximately air tight by the use of the adhesive tape 6, although it is desirable to provide for escape to the outer air of the gas generated by the $CO_2$ refrigerant.

The refrigerant located in the insulating air space surrounding the group of containers of hard frozen product seems to take up the heat from the air within said space as well as from the paper spacers therein, and thereby greatly prolong the edible life of the frozen product, particularly where such product is enclosed by and frozen to and in paper containers.

A dry package is provided as I propose employing refrigerant units, in and as a part of the package, that will not wet the package and thereby damage the same and the food product therein. The $CO_2$, ice whether in snow form or compressed to more solid condition, gradually returns to gas by absorption of heat without liquid deposit. Where the refrigerant employed consists of frozen saline or other liquid, the refrigerant unit consists of such frozen product enclosed within a liquid tight container to hold the liquid as the ice melts and prevent damage to the package and its contents.

The point involved is to provide a non-returnable package that includes one or more containers of food or other product and one or more refrigerant units.

It is evident that various changes, modifications and variations might be resorted to without departing from the spirit and scope of my invention and hence I do not wish to limit myself to the approximately precise disclosures hereof.

What I claim is:

1. An insulating refrigerating shipping and carrying package of frozen product such as ice cream, comprising a group of several closed separately removable individually-complete containers of frozen ice cream and the like, an exterior protective and enclosing insulating paper material knock-down carton of large interior capacity with respect to the size of group of containers of ice cream, spacing means surrounding and holding said group away from the side, bottom and top carton walls, and a refrigerant retained by said spacing means within the carton at the exterior of said group, said spacing means consisting of groups of stiff paper having only edgewise contact with the carton and container walls, said spacing means holding said containers together in group form.

2. An insulating refrigerating shipping and carrying package of frozen product such as ice cream, comprising a group of several closed separately removable individually-complete containers of frozen ice cream and the like, a sealed exterior protective and enclosing knock-down rectangular paper material carton of large interior capacity with respect to the size of said group within the carton, spacing means surrounding and supporting all of containers of ice cream and spacing the same from the carton walls to provide an air space surrounding said containers, and a dry refrigerant retained by said spacing means within the carton at the exterior of said group, said spacing means having narrow edgewise contact only with the walls of the carton and group and holding together the containers of the group.

3. An insulating refrigerating shipping and carrying package of frozen product such as ice cream, comprising a group of several closed separately removable individually-complete containers of frozen ice cream and the like, an exterior protective and enclosing carton of large interior capacity with respect to the size of group of containers of ice cream, insulating spacing members surrounding and supporting said group spaced from the carton walls, and a dry refrigerant retained by said spacing means within the carton at the exterior of said group, said spacing means providing refrigerant retaining cells or holders.

4. An insulating refrigerating shipping and carrying package for closed paper containers of hard frozen ice cream, comprising a knock-down protective paper carton of relatively large capacity folded up from flat form, and separate removable paper material spacing means providing refrigerant receiving cells or openings, and constructed and arranged to loosely fit within the carton when the carton is expanded to operative form and to support and surround the ice cream filled container or containers within the carton and space the same from the carton walls and provide an air space within the carton surrounding the container or containers, and to retain the refrigerant within said space.

In testimony whereof I have hereunto set my hand at Fulton, N. Y., this 11th day of January, 1926.

WILBUR L. WRIGHT.